US012658382B2

(12) United States Patent
Teixeira et al.

(10) Patent No.: US 12,658,382 B2
(45) Date of Patent: Jun. 16, 2026

(54) HIGH-VOLTAGE ARC QUENCHING SYSTEMS AND ELECTRICAL SWITCHING DEVICES COMPRISING THE SAME

(71) Applicants: Tyco Electronics Componentes Electromecanicos Lda, Evora (PT); TE Connectivity Germany GmbH, Bensheim (DE)

(72) Inventors: Tiago Teixeira, Evora (PT); Hugo Fontes, Berlin (DE); Ralf Gollee, Berlin (DE)

(73) Assignees: TE Connectivity Germany GmbH, Bensheim (DE); Tyco Electronics Componentes Electromecanicos Lda, Evora (PT)

( * ) Notice: Subject to any disclaimer, the term of this patent is extended or adjusted under 35 U.S.C. 154(b) by 343 days.

(21) Appl. No.: 18/358,220

(22) Filed: Jul. 25, 2023

(65) Prior Publication Data

US 2024/0029968 A1 Jan. 25, 2024

(30) Foreign Application Priority Data

Jul. 25, 2022 (EP) .................................... 22398016

(51) Int. Cl.
*H01H 9/44* (2006.01)
*H01H 50/54* (2006.01)

(52) U.S. Cl.
CPC ............ *H01H 9/443* (2013.01); *H01H 50/54* (2013.01)

(58) Field of Classification Search
CPC ........... H01H 9/443; H01H 9/36; H01H 9/30; H01H 9/345; H01H 9/346; H01H 9/362;
(Continued)

(56) References Cited

U.S. PATENT DOCUMENTS 2,575,060 A * 11/1951 Matthias ................ H01H 9/443 218/25
5,694,098 A * 12/1997 Mody .................. H01H 77/108 335/16
(Continued)

FOREIGN PATENT DOCUMENTS

CN 203398028 * 1/2014 ............. H01H 33/18
CN 105118729 B 12/2015
(Continued)

OTHER PUBLICATIONS

Translation of CN203398028 (Original document published Jan. 15, 2014) (Year: 2014).*
(Continued)

*Primary Examiner* — William A Bolton
(74) *Attorney, Agent, or Firm* — Barley Snyder

(57) ABSTRACT

An arc quenching system includes an arc-extinguishing unit and an arc-blowing magnetic unit. The arc-extinguishing unit extinguishing an arc discharge produced upon a switching operation of a contact pair from a closed state to an open state. The contact pair having a static contact and a movable contact which is movable relative to the static contact between the closed state and the open state in which the movable contact is spaced apart from the static contact by a gap. The arc-blowing magnetic unit creates a magnetic field having a plurality of magnetic field lines that cross a gap region of the contact pair along a predetermined magnetic field direction. The arc-blowing magnetic unit creates the magnetic field lines with an orientation based on an electrical polarity of the static contact and a positioning of the arc-extinguishing unit to magnetically blow the arc discharge toward the arc-extinguishing unit.

20 Claims, 6 Drawing Sheets

(58) Field of Classification Search
CPC .... H01H 9/44; H01H 9/446; H01H 2009/365; H01H 50/54; H01H 50/041; H01H 50/546; H01H 50/02; H01H 50/38; H01H 2050/028; H01H 73/18
USPC ..... 200/10, 400, 243, 15, 22–24, 26, 30–31, 200/34, 38, 46, 103–105
See application file for complete search history.

(56) References Cited

U.S. PATENT DOCUMENTS

| | | | | |
|---|---|---|---|---|
| 7,679,020 | B2 * | 3/2010 | Schulz | H01H 9/443 335/201 |
| 9,214,305 | B2 * | 12/2015 | Lang | H01H 33/182 |
| 10,068,731 | B2 * | 9/2018 | Zhong | H01H 50/06 |
| 10,176,945 | B2 * | 1/2019 | Domejean | H01H 77/108 |
| 2013/0284702 | A1 * | 10/2013 | Hamada | H01H 9/346 218/26 |
| 2013/0335177 | A1 | 12/2013 | Enomoto | |
| 2015/0054605 | A1 | 2/2015 | Kubono et al. | |
| 2019/0131047 | A1 * | 5/2019 | Priest | H01F 7/064 |
| 2020/0111624 | A1 | 4/2020 | Kralik | |
| 2020/0126741 | A1 * | 4/2020 | Lee | H01H 9/443 |

FOREIGN PATENT DOCUMENTS

| | | | |
|---|---|---|---|
| CN | 106548912 | B | 3/2017 |
| CN | 108962681 | A | 12/2018 |
| CN | 112885640 | A | 6/2021 |
| CN | 113539745 | A | 10/2021 |
| CN | 113782391 | A | 12/2021 |
| JP | S6417338 | A | 1/1989 |
| JP | 2012104364 | A | 5/2012 |
| WO | 2021112343 | A1 | 6/2021 |
| WO | 2022057606 | A1 | 3/2022 |

OTHER PUBLICATIONS

Translation of CN113539745(Original document published Oct. 22, 2021) (Year: 2021).*

Search Report from the European Patent Office dated Dec. 21, 2022, corresponding to Application No. 22398016.0-1201, 16 pages.

Extended European Search Report from the European Patent Office dated Mar. 21, 2022, corresponding to Application No. 22398016.0-1201, 13 pages.

Japanese Office Action dated Jul. 23, 2024 with English translation, corresponding to Application No. 2023-117921, 9 pages.

Korean Office Action dated Oct. 24, 2024 with English translation, corresponding to Application No. 10-2023-0095215, 15 pages.

Indian Examination Report dated Jan. 29, 2026, corresponding to Application No. 202344048778, 7 pages.

* cited by examiner

HIGH-VOLTAGE ARC QUENCHING SYSTEMS AND ELECTRICAL SWITCHING DEVICES COMPRISING THE SAME

CROSS-REFERENCE TO RELATED APPLICATIONS

This application claims the benefit of the filing date under 35 U.S.C. § 119(a)-(d) of European Patent Application No. 22398016.0, filed on Jul. 25, 2022.

FIELD OF THE INVENTION

The present invention relates to the field of arc suppression, and more specifically, to arc-quenching systems for suppressing arc between contacts of switching devices designed to operate under high loads, such as contactors and high-voltage relays, and a switching device including the same.

BACKGROUND

Electrical switching devices such as contactors and high-voltage relays are widely used in a large range of applications that require safe supply of high power to a load circuit, such as in vehicles, equipment for charging power batteries, industrial facilities, and the like.

A contactor or relay in common configurations generally include movable and respective static contact(s) which remain in direct contact with each other during a normal, power supply operation by closing the path of power supply to the load circuit. The contactor or relay is opened when the movable contact is moved away from the static contact, thereby interrupting the power supply path. However, due to the high currents that pass or are to be passed across the movable and static contacts, a high current discharge (or arc current) may still be generated across the separation gap between movable and static contacts when opening and/or closing the contactor or high-voltage relay. For this reason, it is common to include safety mechanisms in such switching devices for suppressing (or quenching) the arc current and protecting them as well as the load circuit against the negative effects of arc discharges. For instance, arc chutes for breaking the arc have been widely used in combination with guiding runners which guide and deliver the arc directly to the arc chute.

Important parameters for the efficiency and reliability of a safety system for arc suppression are the contact distance (i.e. the distance between the movable and respective static contact in an open state) and the expected voltage drop. For instance, a high-voltage contactor for operating at voltage loads of 800 V may require a larger contact distance for breaking the arc than a relay for operating at lower voltages. However, an increase of contact distance implies not only that the relay will have an increased overall size but also the actuator responsible for moving the movable contact needs to be stronger in order to cover the larger contact distance for returning the movable contact from the open to the closed state. For instance, in the case of electromagnetic relays, it might not be feasible to implement a coil-induced magnetic actuator that is sufficiently strong for closing a relay with large contact distance.

Thus, in view of a constant need for safety equipment operable under increasing high-voltage loads while at the same time having a compact size, several approaches have been tried in order to enhance arc suppression by other factors relying alone on an increase of the physical separation between movable and static contacts. For instance, a bridge approach that divides the contact voltage by two has been used. However, the arc discharge per contact may be still sufficiently strong or difficult to break at contact distances used in common contacts and relays. Further, this solution still has the problem that the relay cannot break the arc for a wide range of high-voltages with a small contact distance.

Another approach relies in using magnetic arc suppression to compensate for a reduced contact distance and to help achieving the same or enhanced arc suppression while using small contact distances. This approach is based on extending the path that the arc will have to travel between contacts by adding magnets capable of creating a magnetic field in the region between the movable and static contacts that is sufficiently strong to displace the arc current along an extended arc length. An enhancement of the arc suppression may then be achieved in case this extended path is larger than the energy available to overcome it. This approach has, however, several limitations. For instance, the size of the magnets necessary to achieve the required enhanced effect onto arc suppression may negatively impact the compactness of the contactor or high-voltage relay. The magnets available at an affordable price may not have the required strength for achieving the required arc suppression.

Hence, in view of the constant development of electrical equipment for operating at increasingly high-voltages, there is still a need for solutions capable of providing electrical switching devices with enhanced high-voltage arc suppression without compromising compactness and overall costs of the switching devices.

SUMMARY

An arc quenching system includes an arc-extinguishing unit and an arc-blowing magnetic unit. The arc-extinguishing unit extinguishing an arc discharge produced upon a switching operation of a contact pair from a closed state to an open state. The contact pair having a static contact and a movable contact which is movable relative to the static contact between the closed state and the open state in which the movable contact is spaced apart from the static contact by a gap. The arc-blowing magnetic unit creates a magnetic field having a plurality of magnetic field lines that cross a gap region of the contact pair along a predetermined magnetic field direction. The arc-blowing magnetic unit creates the magnetic field lines with an orientation based on an electrical polarity of the static contact and a positioning of the arc-extinguishing unit to magnetically blow the arc discharge toward the arc-extinguishing unit.

BRIEF DESCRIPTION OF THE DRAWINGS

Features and advantages will become apparent from the following more particular description of the various embodiments of the invention, as illustrated in the accompanying drawings, in which like references refer to like elements, and wherein.

DETAILED DESCRIPTION OF THE EMBODIMENTS

The accompanying drawings are incorporated into the specification and form a part of the specification to illustrate several embodiments of the present invention. These drawings, together with the description, serve to explain the principles of the invention. The drawings are merely for the purpose of illustrating the examples of how the invention can be made and used, and are not to be construed as limiting the invention to only the illustrated and described embodiments. Furthermore, several aspects of the embodiments may form, individually or in different combinations, solutions according to the present invention. The following described embodiments thus can be considered either alone or in an arbitrary combination thereof.

The present invention will now be more fully described with reference to the Figures, in which exemplary embodiments of the invention are shown. The present invention may, however, be embodied in many different forms and should not be construed as limited to the embodiments set forth herein. Rather, these embodiments are provided so that the disclosure will convey the scope of the invention to those skilled in the art.

Figure 1:
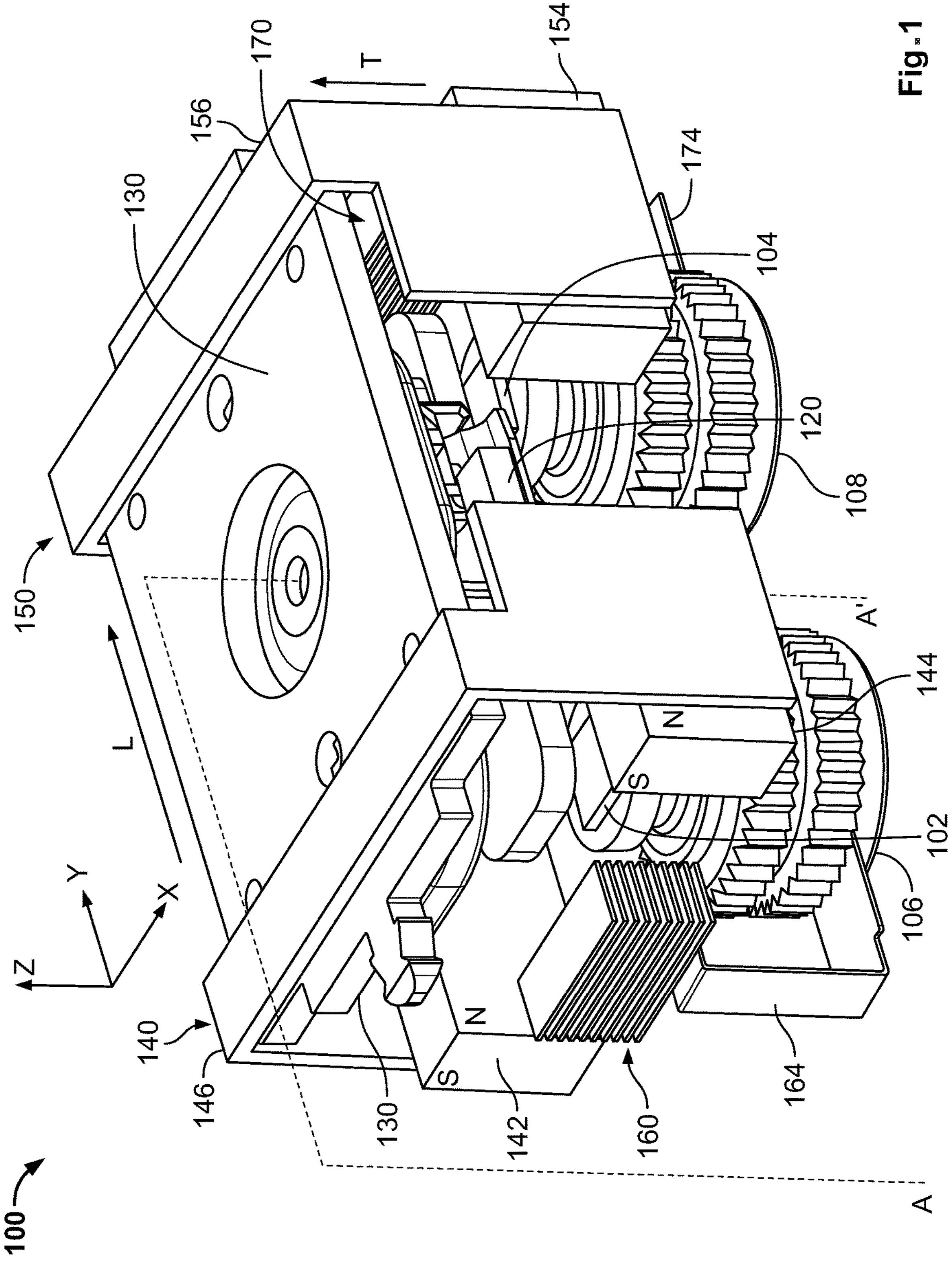
FIG. 1 is a perspective view of an arc quenching system and a switching device according to an embodiment of the present invention.

FIG. 1 shows a schematic perspective view of a switching device 100 and an arc quenching system for protecting a contact assembly of the switching device 100 according to an embodiment of the present invention. The switching device 100 can be a contactor, a high-voltage relay, and the like. Components of the switching device 100, such as electromagnetic driving mechanism for operating the switching device contact assembly, housing, and the like, have been omitted in FIG. 1 for facilitating the representation of the features of the arc quenching system according to the present invention and explanation of its working principle. For ease of reference, term "contactor" will be used in the following description when referring to the switching device according to the principles of the present invention. However, it should be understood that the present disclosure is also applicable to the other types of switching devices, such a high-voltage relays.

As shown in FIG. 1, the contactor 100 includes an assembly of contacts which are operable to switch between a closed and open states for connecting and disconnecting the contactor 100 to lines of an external power source and/or a load circuit. Specifically, the contacts assembly includes a plurality of static contacts, for e.g. two static contacts 102 and 104 as in the illustrated configuration, which are disposed adjacent to each other along a longitudinal direction L of the contactor 100 (i.e. the Y-direction in FIG. 1). Each of the static contacts 102 and 104 are arranged on respective terminals 106, 108 through which the contactor 100 is connected to external electrical potentials, such as terminals of a power supply equipment and/or of load (not shown). The contacts 102 and 104 are static in the sense that they do not move relatively to other fixed parts of the contactor 100, such as a contactor chassis 130.

The contacts assembly further includes a plurality of movable contacts 112 and 114 (for example in the same number as the number of static contacts 102 and 112) disposed adjacent to each other along the longitudinal direction L. The movable contacts 112 and 114 can be moved relatively to the chassis 130 and the static contacts 102, 104 along a direction T of relative movement, which is orthogonal to the longitudinal direction L along which the static contacts 102, 104 and movable contacts 112 and 114 are disposed, between a closed state and an open state of the contactor 100. Each of the movable contacts 112 and 114 is disposed opposed to and aligned with a respective one of the static contacts 102, 104, thereby forming respective contact pairs. Each contact pair, such as the pair of movable and static contacts 102, 112, thus establishes an electric path when the movable and static contacts 102, 112 are in direct contact with each other (closed state) and which is interrupted upon an operation which moves the movable contact 112 away from the static contact 102 in the direction of relative movement T (open state). In the open state, the movable contacts 112 and 114 are spaced apart from the static contacts 102, 104 by a gap of a given contact distance in the direction of the relative movement T.

Figure 2:
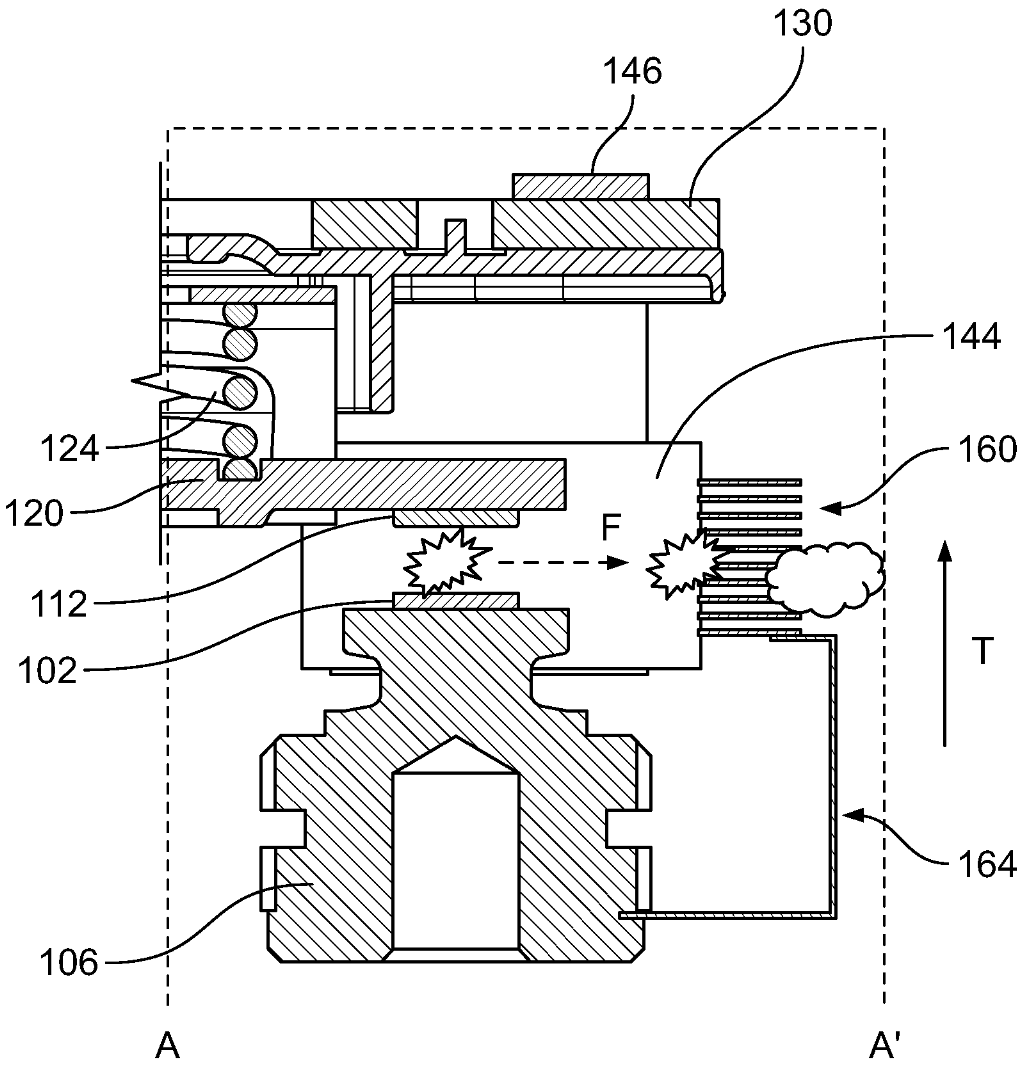
FIG. 2 is a sectional side view showing a section through the switching device of FIG. 1 along the intersection line AA' drawn in FIG. 1 (viewed in the positive Y-direction)

The movable contacts 112 and 114 may be mounted on a contact bridge 120 which extends parallel to the longitudinal direction L and which can be moved towards and away from the static contacts 102, 104 along the direction T of relative movement under actuation of a driving mechanism, for e.g. an armature of an electromagnetic driver, upon a switching operation which brings the movable contacts 112, 114 into direct contact with the respective static contacts 102, 104 for closing the contact pairs or which separates the movable and static contacts 102, 104 for opening the contact pairs. The contact bridge 120 may be made of an electrically conductive material for electrically connecting the movable contacts 112, 114 to each other. An electrical current path from the terminal 106 to the terminal 108 and across the contactor 100 may then be established or interrupted when the movable contacts 112, 114 are in direct contact with or separated from the respective static contacts 102, 104, respectively. As shown in FIG. 2, the contact bridge 120 may be fixed to the chassis 130 of the contactor 100 via a spring 124 which allows displacement of the contact bridge 120 in the direction of relative movement T between the open and closed states.

As mentioned above, upon a switching operation for opening the switching device 100, an arc will be created across the gap between the static and movable contacts of each contact pair (for e.g. the pair of contacts 102, 112 and the pair of contacts 104, 114 shown in FIG. 1). In the open state, each movable contact 112, 114 is separated apart from the respective static contact 102, 104 by a gap in the direction T of relative movement. The width of the gap in the direction T, also referred to as contact distance, will depend on the characteristics and specific application of the switching device 100, such as insulating medium surrounding the contacts assembly and high-voltage load carried by the switching device 100. The ability for an arc being suppressed over the contacts gap by the insulating medium alone decreases with decreasing contact distance and with increasing high-voltage load. Hence, it is advantageous to provide an arc-quenching system which can effectively extinguish the arc and avoid damaging the switching device 100 for a given contact distance and high-voltage load.

The present invention prevents that arc discharges damage the switching device 100 by providing an arc-quenching system that deviates the arc discharge away from the contacts gap region and towards arc-extinguishing features arranged proximate to the gap region, but outside the chamber where the contacts 102, 104, 112, 114 are disposed, to safely extinguished or quenched the arc. More specifically, the arc-quenching system is based on the concept of providing an arc-blowing magnetic unit which creates a permanent magnetic field in the gap region of each contact pair and that is capable of extending the arc path along which the arc is extinguished towards a dedicated arc-extinguishing unit positioned outside the region of the contacts assembly 102, 112, 104, and 114 for extinguish the deviated arc, as it will be described in the following embodiments.

Referring to FIG. 1, the contactor 100 has an arc-quenching system which includes a plurality of arc-blowing magnetic units 140, 150, each arc-blowing magnetic units 140, 150 in correspondence with a respective contact pair for magnetically blowing the arc discharge created between the static and movable of the contact pair. Specifically, the arc-quenching system has a first arc-blowing magnetic unit 140 for magnetically blowing an arc discharge, which is created across the gap between the first pair of contacts 102, 112, away from the respective contact gap and a second arc-blowing magnetic unit 150 for magnetically blowing an arc discharge produced across the gap between the second pair of contacts 104, 114 away from the respective contact gap. In other words, in this configuration the arc-quenching system is provided with a number of arc-blowing magnetic units corresponding to the number of contact pairs to be protected against arc discharges.

The arc-blowing magnetic units 140, 150 are fixed to the contactor chassis 130 and disposed spaced apart along the longitudinal direction L of the contacts assembly and respectively aligned with the position of the associated contact pair. Each of the plurality of arc-blowing magnetic units 140, 150 creates a permanent magnetic field in the gap region of the correspondent contact pair in which the magnetic field lines in the gap region are substantially oriented along a direction orthogonal to both the longitudinal direction L and the transverse direction T.

Specifically, the first arc-blowing magnetic unit 140 includes a first magnet 142 disposed on one side of the contact pair 102, 112 and the contacts assembly 102, 112, 104, 114 (i.e. on the back side of the switching device in FIG. 1) and a second magnet 144 disposed opposed to the first magnet 142 and at the opposed side of the contact pair 102, 112 and the contacts assembly 102, 112, 104, 114 (i.e. on the front side of the switching device in FIG. 1) with respect to a symmetry plane parallel to the line AA' represented in FIG. 1. The first arc-blowing magnetic unit 140 is positioned in alignment with the first contact pair 102, 112 (i.e. it does not overlap the second contact pair 104, 114) so as to create a first magnetic field having magnetic field lines along (i.e. parallel to) the predetermined magnetic field direction within the region of the gap of the first contact pair 102, 112.

The first and second magnets 142, 144 may be permanent magnets. However, other types of magnets, such as magnets made from soft magnetic material may be used, depending on the application.

The first and second permanent magnets 142, 144 are disposed with front sides facing each other such that the magnetic flux lines within the gap region flows from the front side of the first permanent magnet 142 towards the front side of the second permanent magnet 144 along the predetermined magnetic field direction. In addition, the first and second permanent magnets 142, 144 are positioned at substantially at the same distance from the chassis 130 and oriented in parallel to each other with inverse polarizations which are selected so as to create a magnetic field with magnetic field lines that are substantially aligned along a direction transverse to both the longitudinal direction L and the direction of relative movement T in the region around the gap between the static and movable contacts 102, 112. In addition, the dimensions of the first and second permanent magnets 142, 144 may be selected such as to create an approximately homogeneous magnetic field over the gap region of the respective contact pair 102, 112. The magnetic strength of the first and second permanent magnets 142, 144 will depend on the intensity of the desired arc-blow magnetic effect, and therefore, on the specific application and characteristics of the contactor 100.

In case the associated contact pairs have similar properties, such as similar contact distances and intensity of arc discharges, the second arc-blowing magnetic unit 150 is provided with structural and magnetic features similar to those described above for the first arc-blowing magnetic unit 140 so as to create parallel magnetic fields with substantially the same intensity. However, the first and second arc-blowing magnetic units 140, 150 are separate and independent units in the sense that they do not share with each other those features that produce the respective magnetic fields. In particular, the second arc-blowing magnetic unit 150 includes a first magnet 152 to be disposed on one side of the contact pair 104, 114 and the contacts assembly 102, 112, 104, 114 (i.e. on the back side of the switching device in FIG. 1) and a second magnet 154 disposed opposed to the first magnet 152 and at the opposed side of the contact pair 104, 114 and the contacts assembly 102, 112, 104, 114 (i.e. on the front side of the switching device in FIG. 1) with respect to a symmetry plane parallel to the line AA' represented in FIG. 1. The second arc-blowing magnetic unit 150 is then positioned in alignment with the second contact pair 104, 114 (and without overlapping the first contact pair 102, 112) to create a second magnetic field having magnetic field lines along (i.e. parallel to) the predetermined magnetic field direction within the region of the gap of the second contact pair 104, 114.

In addition, the first arc-blowing magnetic unit 140 includes a magnetic flux frame 146 on which the first and second permanent magnets 142, 144 are mounted and which also serves as support for positioning the first and second permanent magnets 142, 144 on the contactor chassis 130.

Similarly, the second arc-blowing magnetic unit 150 also includes a magnetic flux frame 156 which carries the first and second permanent magnets 152, 154 and which is to be mounted on the contactor chassis 130. Each of the magnetic flux frames 146 and 156 provide respective magnetic flux paths for the magnetic lines which flow from a back side of the respective second permanent magnets 144 and 154 to a back side of the respective first permanent magnets 142 and 152. In an embodiment, the magnetic flux frames 146 and 156 are U-shaped plates with a central, flat area adapted to easily mount the arc-blowing magnetic units 140, 150 on the contactor chassis 130 and with left and right arms extending from the central plate at a right angle (i.e. away from the chassis 130 and towards the terminals 106 and 108) such that the first and second permanent magnets 142, 146 are mounted with a parallel orientation with respect to each other and parallel to the direction of the relative transverse movement T. The left and right arms of the U-shaped magnetic flux frames 146, 156 have a length suitable for positioning the respective first and second permanent magnets in alignment with the gap region of the respective contact pairs 102, 112 and 104, 114 when the magnetic flux frame is mounted to the chassis 130. The magnetic polarizations of the first and second permanent magnets 142, 144 are selected such that the created magnetic field lines are oriented from the first 142 towards the second permanent magnet 144 within the gap region and which follows the orientation which is determined for the electrical polarity of the static contact 102 (which corresponds to the electrical polarity of the terminal 106), as it will be described below.

As shown in FIG. 1, the arc-quenching system further includes a plurality of arc-extinguishing units 160, 170, i.e. in the same number as the number of contact pairs. Each of the arc-extinguishing units 160 and 170 are positioned in correspondence with a respective contact pair, i.e. pairs 102, 112 and 104, 114, for receiving and extinguishing the arc discharge produced between the static and movable contacts of the associated contact pair and which are independently deviated by the arc-blowing magnetic units 140, 150. More specifically, a first arc-extinguishing unit 160 is positioned at a lateral side of the contacts assembly 102, 104, 112, 114 and in correspondence with the first contact pair 102, 112 and the first arc-blowing magnetic unit 140. A second arc-extinguishing unit 170 associated with the second contact pair 104, 114 is positioned at the opposed lateral side of the contacts assembly 102, 104, 112, 114 and in correspondence with the second contact pair 104, 114 and the second arc-blowing magnetic unit 150. As both arc-extinguishing units 160 and 170 are provided at the lateral sides of the contacts assembly 102, 104, 112, 114 (i.e. on the outer sides of an area where the contact assembly 102, 104, 112, 114 is arranged), the arc-quenching system may be easily incorporated into existing switching devices since there is no need to modify the spacing between the switching device terminals, the dimensions of contact bridge, and the like, for accommodating the arc-extinguishing units proximate to the respective contact pairs.

In order to direct the arc discharge produced at a contact pair to the respectively positioned arc-extinguishing unit, for e.g. the contact pair 102, 112 and the arc-extinguishing unit 160, the relative polarization of the first and second permanent magnets 142, 144 of the respective arc-blowing magnetic unit 140 is selected in correspondence with the electrical polarity of the contactor terminals 106, 108 so as to set a direction of the produced magnetic blowing effect which deviates the arc discharge produced during an opening operation of the contacts 102, 112 towards the arc-extinguishing unit 160. More specifically, the electrical polarity of the contactor terminals 106, 108 determines the direction of current flowing across the contactor 100 and the pair of contacts 102, 112 in the closed state, which will be the same direction of an arc discharge produced across the contact pair 102, 112 upon a switching operation to open the contactor 100. The direction of the arc discharge and the orientation of magnetic field lines created by the first and second permanent magnets 142, 144 across the gap region determines, in turn, the direction of the Lorentz force applied onto the electrical charges of the arc current. It is then sufficient to provide a single arc-extinguishing unit per contact pair proximate to the contact pair and positioned in the direction of the generated Lorenz force. Thus, by correlating the polarization of the first and second permanent magnets 142, 144 according to the electrical polarity to be connected to the corresponding static contact 102 (or terminal 106) of the contactor 100 it is ensured that the magnetic blowing effect produced by the arc-blowing magnetic unit 140 extends and deviates the arc path towards the respective arc-extinguishing unit 150 specifically positioned in the direction of the magnetic blowing.

Referring to FIG. 1, in the case where the terminals 106 and 108 are set to be connected to positive and negative potentials, respectively, the direction of the arc current for the contact pair 102, 112 is generally upwards. The polarization of the first and second permanent magnets 142, 144 of the first arc-blowing magnetic unit 140 is therefore selected so that the magnetic field lines are oriented from the first permanent magnet 142 to the second permanent magnet 144 across the gap region between contacts 102, 112. As a result, the arc discharge produced within the gap region upon a switching operation to open the contactor 100 is deviated towards the arc-quenching unit 160 by the produced Lorenz force.

With regard to the contact pair 104, 114 connected to the negative terminal 108, the arc current produced upon the switching operation to open the contactor 100 is directed downwards and the arc-quenching unit 170 arranged on the left side of the contact pair 104, 114. In this case, the polarization of the first and second permanent magnets 152, 154 of the second arc-blowing magnetic unit 150 is selected so that the magnetic field lines are oriented from the first permanent magnet 152 to the second permanent magnet 154 across the gap region between contacts 104, 114, i.e. with the same relative polarization as in the arc-blowing magnetic unit 140. For example, the first permanent magnet 142 may be oriented with respect to the second permanent magnet 144 such that its front side coincides with the N pole while the front side of the second permanent magnet 144 corresponds to the S pole. As a result, the arc discharge produced within the gap region of the contact pair 104, 114 is deviated to the left by the generated Lorenz force, i.e. towards the arc-quenching unit 170.

Thus, the arc-quenching system according to the principles of the present invention provides enhanced arc suppression in direct correlation with a mode of operation of the switching device (i.e. an electric polarity of the static contacts) since an arc discharge generated at a specific contact pair will be magnetically blown away towards a dedicated arc chute positioned on a region outside the contact assembly and relatively positioned in the direction of the Lorenz force produced for one specific direction of the arc discharge so as to capture the magnetically blown arc. As a result, in addition to the advantage provided by the magnetically assisted arc-quenching, the amount of arc chutes provided in the switching device may be reduced to a minimum since only one arc chute per contact pair is required for receiving and extinguishing the arc discharge produced at each contact pair. The arc-quenching system thus allows to reduce the number of components of the switching device, the overall size and associated production costs, with a small compromise in terms of the polarity imposed on to the switching device terminals.

The first and second arc-extinguishing units 160, 170 may be arc chutes, each having a plurality of arc-extinguishing elements, such as flat splitting blades or fins, which are arranged in parallel to each other and at close distance for splitting the voltage of the arc captured in the arc chute. Each of the first and second arc-extinguishing units 160, 170 may be arranged so as to have the parallel splitting blades oriented transversally to the direction of relative movement T, as shown in FIG. 1.

Figure 7:
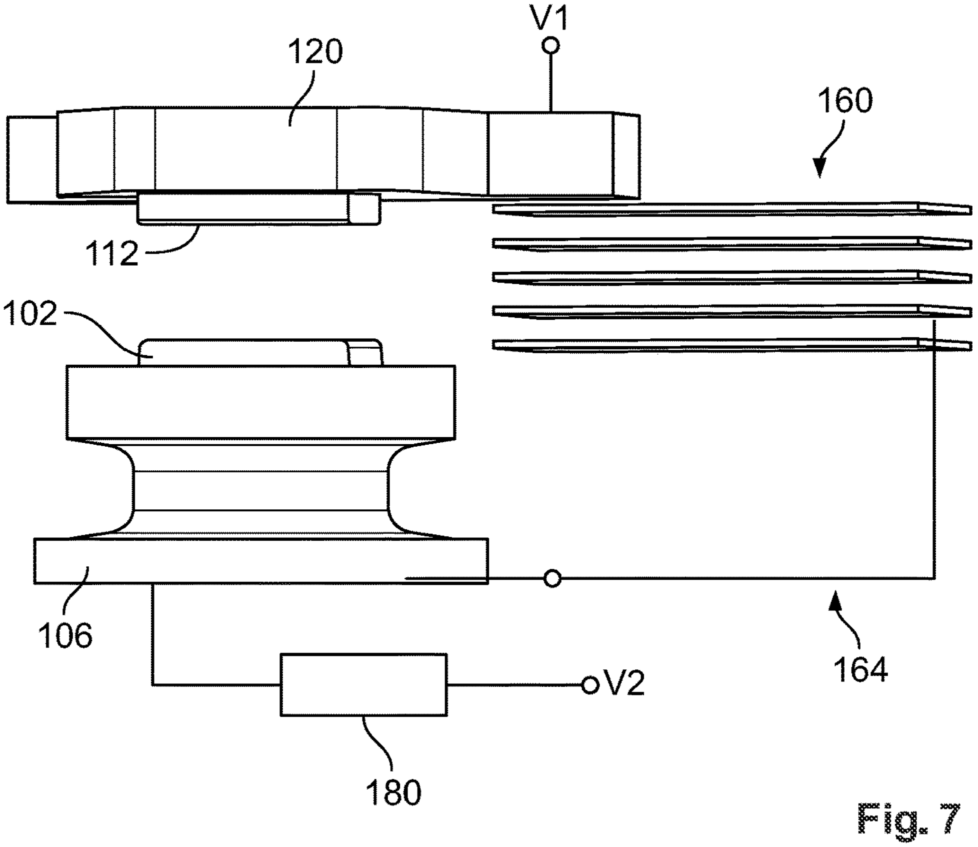
FIG. 7 is a schematic view depicting a pair of static and movable contacts of a contact pair and an arc chute which is directly connected to a terminal of the static contact by an electrical conducting element according to embodiments of the present invention.

In addition, one of the splitting blades of the first arc-extinguishing unit 160 may be electrically connected to the terminal 106 of the contactor 100 so as to remain at the same electrical potential, as illustrated in FIG. 7. The contact terminal 106 may be connected to a high-voltage electric potential V2 via a load 180. For example, a high-voltage electric potential V2 of 225 V and a load of 0.2Ω may be used and the contact bridge 120 kept at an electric potential V1 of 0 V. However, these are merely exemplary values and should not be regarded as limiting the present invention. Similarly, one of the splitting blades of the second arc-extinguishing unit 170 is electrically connected to the terminal 108 of the contactor 100. The electrical connection of the lower splitting blades of the arc-extinguishing units 160, 170 to the same electrical potential as the corresponding terminals 106 and 108, respectively, allows to prevent that the arc discharge produced across the static and movable contacts 102, 112 and 104, 114 upon an opening operation would be enhanced by the splitting blades from the first and second arc-extinguishing units 160, 170 due to being positioned in close vicinity of the respective contact pairs 102, 112 and 104, 114.

The electrical connection of the splitting blades from the first and second arc-extinguishing units 160, 170 to the contactor terminals 106, 108 may be implemented via electrically conductive elements, such as stripes 164, 174 or wires made of an electrically conductive material. This electrically conductive elements 164, 174 are provided for the purpose of maintaining the respective splitting blades at the same electrical potential as the terminals to which they are connected to, and therefore, are distinct from guiding runners used in conventional arc chutes for guiding and delivering an arc discharge directly to the arc chute.

In the configuration of the switching device 100 shown in FIG. 1, the arc-quenching system is provided with one arc-blowing magnetic unit for each contact pair (i.e. the first arc-blowing magnetic unit 140 associated with contact pair 102, 112 and the second arc-blowing magnetic unit 150 associated with contact pair 104, 114) and divides the arrangement of the arc-extinguishing units 160 and 170 between the left and right sides of the contacts assembly 102, 104, 112, 114, i.e. between the left and right sides of the corresponding switching device 100, with respect to a symmetry plane (not shown) that crosses an intermediate region between the first contact pair 102, 112 and the second contact pair 104, 114, along the direction of relative movement T and in a direction transverse to the longitudinal direction L. As shown in FIG. 1, the arc-extinguishing units 160 and 170 are therefore arranged spaced apart in the longitudinal direction L and on opposed sides of the electrical switching device 100.

In alternate configurations, the magnetic blowing effect may be achieved by using a single arc-blowing magnetic unit having some features similar to those described with reference to FIG. 1, but which is designed and oriented such as to create a magnetic field that actuates on the gap regions of all or at least two of the contact pairs forming the contacts assembly of the switching device. The desired magnetic blowing effect may then be produced for all arc columns using the same magnetic field, as it will be now explained with reference to FIGS. 3 and 4.

Figure 3:
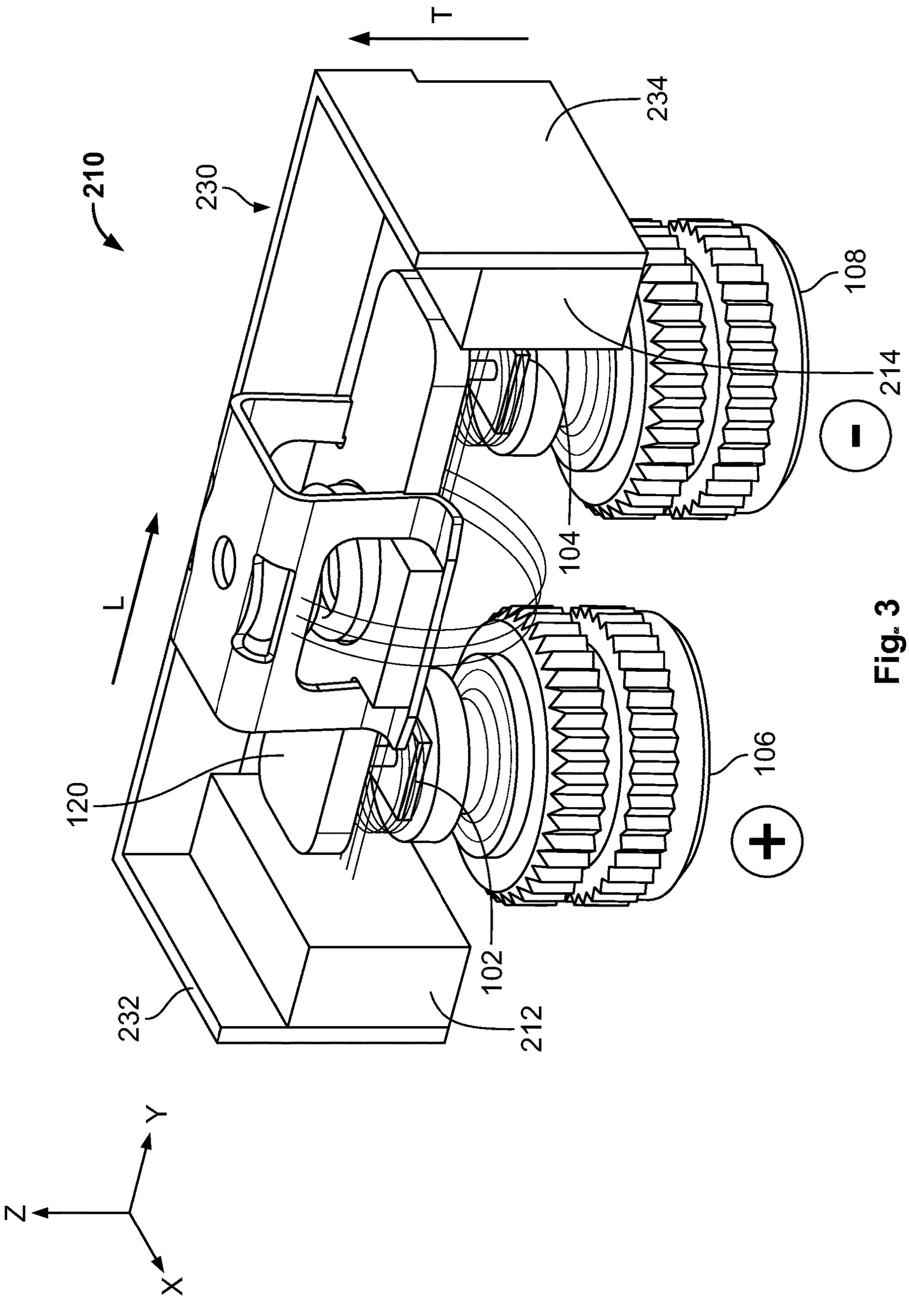
FIG. 3 is a perspective view of an arc-blowing magnetic unit of an arc quenching system according to embodiments of the present invention.
Figure 4:
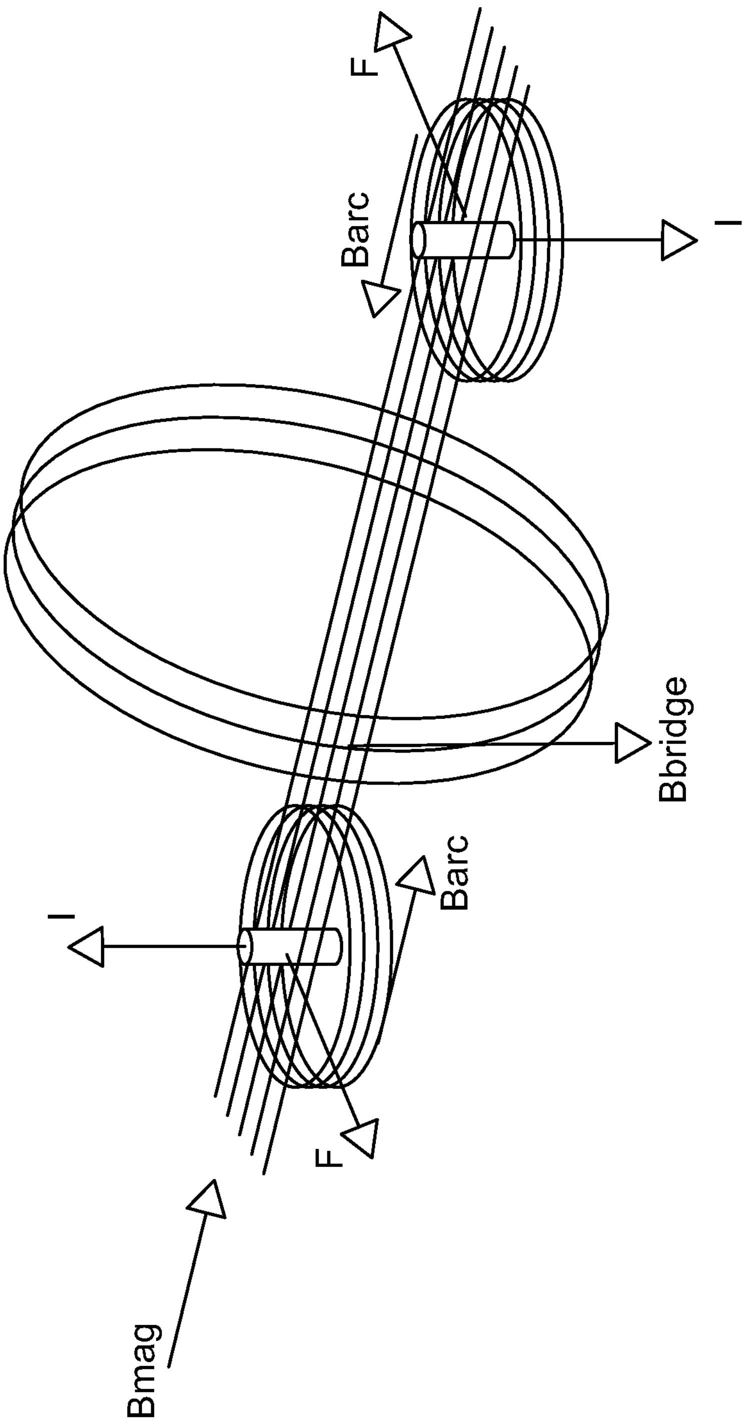
FIG. 4 shows schematically the orientation of magnetic field lines of the magnetic field created by the arc-blowing magnetic unit of FIG. 3 within an intermediate region where the movable and static contacts are arranged, the direction of the magnetic field generated by the current flowing along a contact bridge between two contact pairs of a switching device, the direction of the magnetic field generated by the arc column produced at each contact pair, and the resultant Lorenz force that actuates onto each arc column.

FIGS. 3 and 4 show an arc-blowing magnetic unit 210 of an arc-extinguishing system for a switching device 200 according to another embodiment. The structure, operation and relative positioning of the terminals 106 and 108, the static contacts 102 and 104, the movable contacts 112 and 114, and conducting bridge 120 of the switching device 100 described above with reference to FIGS. 1 and 2 are the same as for the switching device 200 in the present embodiment, and therefore, the description of these features of the switching device 200 will not be repeated here.

Referring to FIG. 3, the arc-blowing magnetic unit 210 includes a first permanent magnet 212 disposed on one side of the first contact pair 102, 112, which is a lateral side of the contacts assembly formed by the first and second contact pairs 102, 112, and 104, 114 (i.e. on the left side with regard to the front side of the contact assembly 102, 112, 104, 114 shown in FIG. 3) and a second permanent magnet 214 disposed in the longitudinal direction L, diametrically opposed to the first permanent magnet 212, and at the opposed lateral side of the contacts assembly 102, 112, 104, and 114 (i.e. on the right side with regard to the front side of the contact assembly 102, 112, 104, 114, which coincides with the positive direction of the Y-axis shown in FIG. 3). The first and second permanent magnets 212, 214 are positioned at substantially the same distance from the switching device chassis and oriented in parallel to each other with inverse polarizations so as to create a magnetic field with magnetic field lines that extend over the region between the contact pairs 102, 112 and 104, 114 and therefore, substantially aligned along a direction parallel to the longitudinal direction L and transverse to the direction of relative movement T, at least in a region around the gaps between the static and movable contacts 102, 112 and 104, 114. The dimensions and magnetic strength of the first and second permanent magnets 212, 214 is selected such as to create an approximately homogeneous magnetic field across the gap region of both the first contact pair 102, 112 and the second contact pair 104, 114. Further, the magnetic strength of the first and second permanent magnets 212, 214 is also selected based on the intensity of the desired arc-blow magnetic effect and the distance between the contact pairs 102, 112 and 104, 114, and therefore, on the specific application and characteristics of the switching device 200.

Similarly to the previous embodiment, the arc-blowing magnetic unit 210 includes a magnetic flux frame 230 on which the first and second permanent magnets 212 and 214 are mounted and which also serves as support for positioning the first and second permanent magnets 212 and 214 on the contactor chassis 130. In an embodiment, the magnetic flux frame 230 is a U-shaped plate with a central, flat area which is designed to extend along the longitudinal direction L and with a length suitable for covering the first pair of static and movable contacts 102 and 112 and the second pair of static and movable contacts 104 and 114, and therefore, position the first and second permanent magnets 212 and 214 on each lateral side of the assembly of contacts 102, 112, 104, and 114. The magnetic flux frame 230 further includes left and right arms 232, 234 extending towards the front side of the assembly of contacts 102, 112, 104, and 114 (i.e. towards the positive direction of the X-axis in FIG. 3) and onto which the first and second permanent magnets 212 and 214 are respectively mounted with a parallel orientation with respect to each other, which is also parallel to the direction of the relative transverse movement T and transverse to the longitudinal direction L. The left and right arms 232 and 234 of the U-shaped magnetic flux frame 230 have a length suitable for positioning the permanent magnets 212 and 214 aligned with the gap regions of both the first pair of static and movable contacts 102 and 112 and the second pair of static and movable contacts 104 and 114.

As shown in FIG. 4, the first and second permanent magnets 212 and 214 are selected to have relative polarizations so that the created magnetic field lines (Bmag) are oriented from the first permanent magnet 212 towards the second permanent magnet 214 along the region where the assembly of contacts 102, 112, 104, and 114 are arranged. The magnetic field produced by the arc-blowing magnetic unit 210 together with the magnetic field produced by the current flowing through the stationary and movable contacts of a contact pair, results in a total electromagnetic force F that is substantially oriented in a direction away from the center of the gaps of each contact pair. The resultant electromagnetic force F actuates onto the charges of the arc generated between contacts, thereby extending and deforming the arc column in the direction of the resultant electromagnetic force F. As explained above with reference to the configuration of FIGS. 1 and 2, the sense of the resultant magnetic blow effect, i.e. whether the arc column is deviated towards the front side or to the back side of the contacts assembly 102, 112, 104, and 114, as in the configuration of FIG. 3, is still correlated with the sense of the arc discharge current, and therefore, on the electrical polarity of the terminals 106 and 108 (which corresponds to the electrical polarity of the static contacts 102 and 104). For instance, in the case where the terminals 106 and 108 are set to be connected to positive and negative potentials, respectively, the direction of the arc current is upwards across the first contact pair 102, 112 and downwards across the second contact pair 104, 114, as illustrated in FIG. 4.

The relative polarization between the first and second permanent magnets 212, 214 of the arc-blowing magnetic unit 210 may therefore be selected so that the magnetic field lines are oriented from the first permanent magnet 212 towards the second permanent magnet 214 across the gap region between the static and movable contacts 102, 112 of the first contact pair as well as across the gap region between the static and movable contacts 104, 114 of the second contact pair. As a result, the arc columns produced at the contact pairs 102, 112 and 104, 114 will be extended and deviated (i.e. magnetically blown) in opposite directions under the actuation of symmetrically opposed Lorenz forces.

The arc columns which are magnetically blown by the arc-blowing magnetic unit 210 may be trapped and quenched in respective arc-extinguishing units associated with each contact pair and which are positioned in correspondence with the respective contact pair and terminal polarity, as it will be described with reference to the embodiments illustrated in FIGS. 5 and 6.

Figure 5:
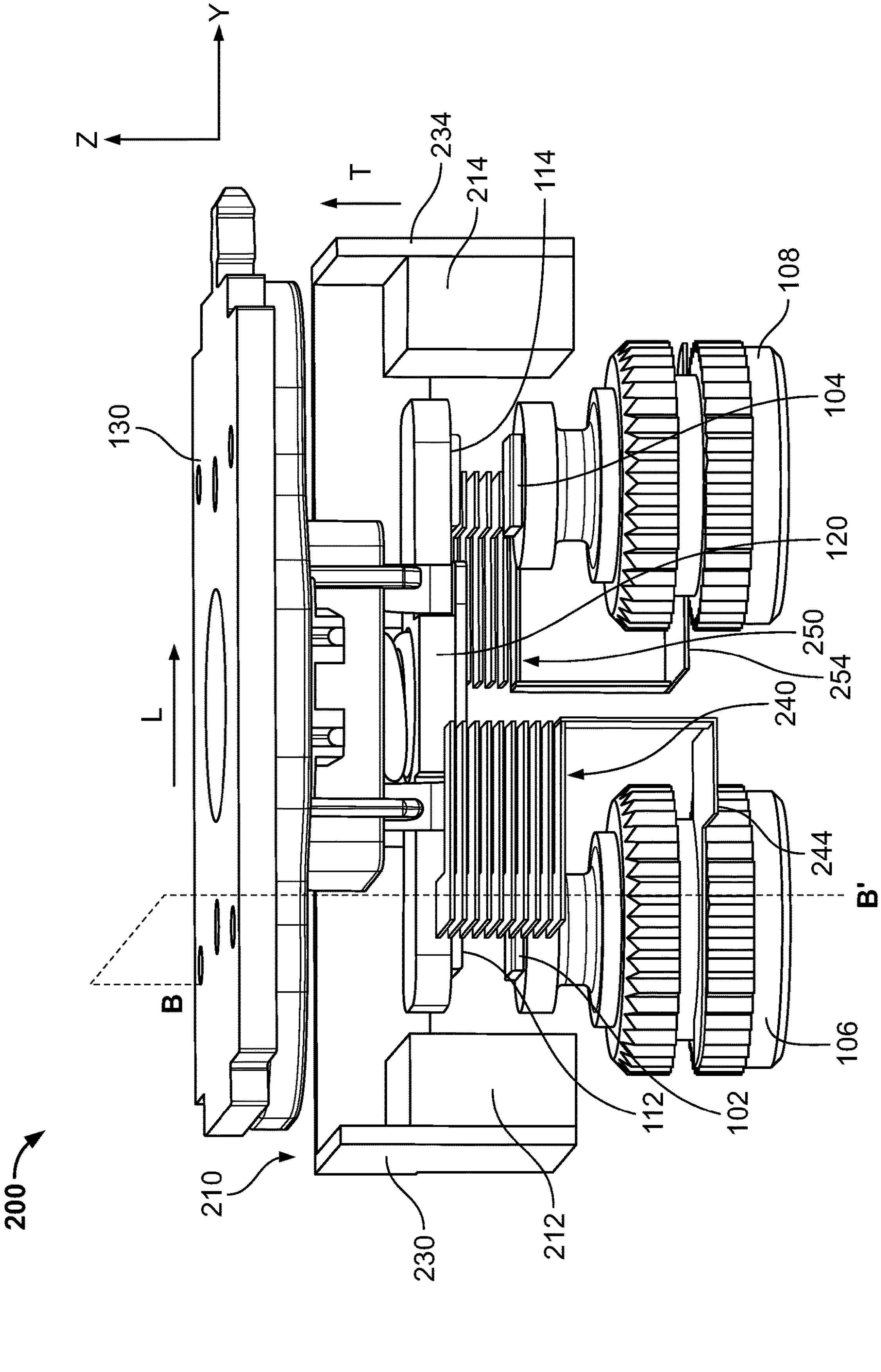
FIG. 5 is a perspective view showing an arc quenching system and a switching device according to a further embodiment of the present invention.
Figure 6:
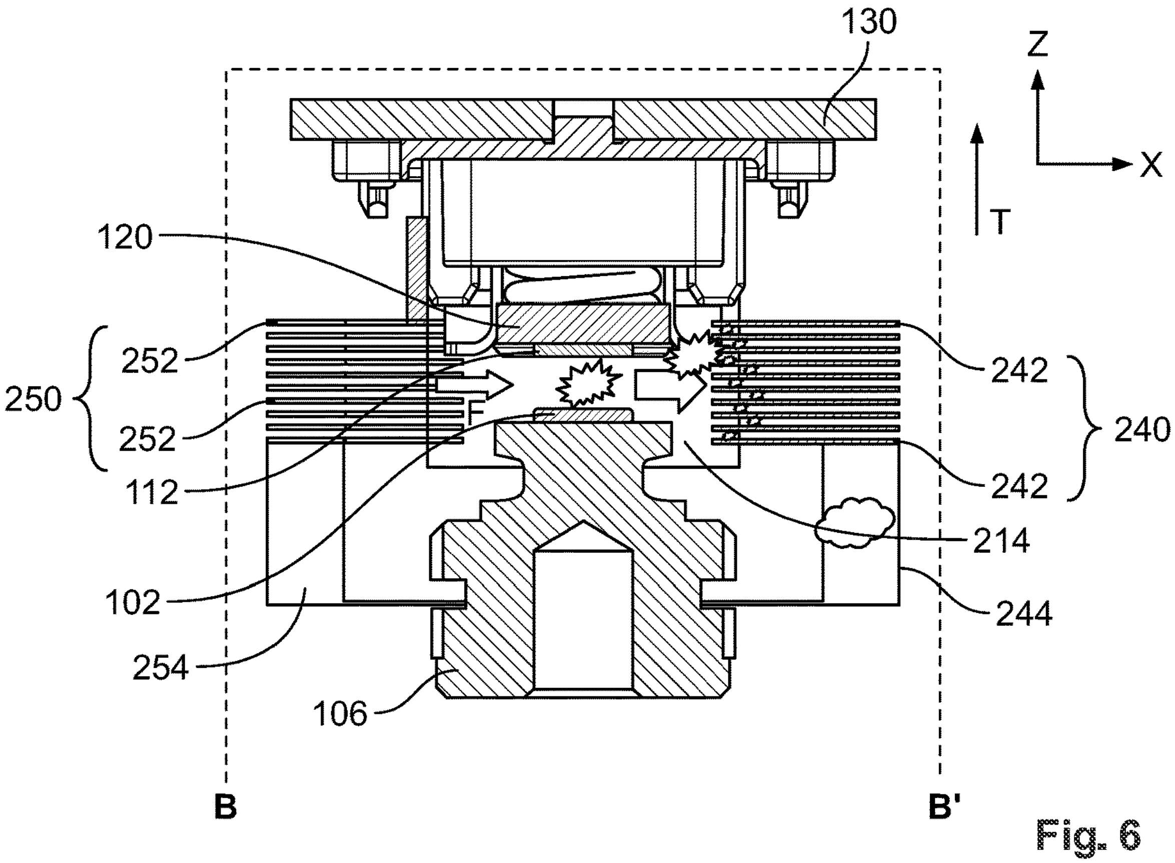
FIG. 6 is a schematic sectional view of a section through the switching device of FIG. 5 along the line BB' drawn in FIG. 5 (viewed in the positive Y-direction)

FIG. 5 is a perspective view showing an arc quenching system and the switching device 200 according to an embodiment, in which the arc-extinguishing system includes the arc-blowing magnetic unit 210. In addition, the arc-quenching system includes a plurality of arc-extinguishing units 240 and 250, each in correspondence with a respective one of the terminals 106 and 108 and associated contact pairs 102, 112 and 104, 114. The first and second arc-extinguishing units 240 and 250 are positioned proximate to the respective contact pairs 102, 112 and 104, 114 and in the direction of the magnetic blow generated by the arc-blowing magnetic unit 210 at the gap regions of each of the contact pairs 102, 112 and 104, 114, and which is determined, in turn, by the electrical polarity of the respective terminals 106 and 108.

Accordingly, for a polarity configuration at which the terminal 106 is positive relative to the polarity of the terminal 108 and the first and second magnets 212, 214 magnetically polarized to produce magnetic field lines oriented from the first magnet 212 towards the second magnet 214, as explained with reference to FIGS. 3 and 4, the arc-extinguishing system includes a first arc-extinguishing unit 240 associated with the first contact pair of static and movable contacts 102, 112 that is positioned at a front side of the contacts assembly 102, 104, 112, 114 (i.e. in the positive direction of the X-axis shown in FIG. 6) and in correspondence with the gap region between the static and movable contacts 102, 112 so as to receive and quench the arc discharge produced across the gap of the first contact pair 102, 112 upon an opening operation. This arc discharge is blown away from the contacts gap region towards the first arc-extinguishing unit 240 by the resultant Lorenz force produced by the arc-blowing magnetic unit 210.

In addition, the arc-extinguishing system includes a second arc-extinguishing unit 250 associated with the second pair of static and movable contacts 104, 114 and which is positioned in correspondence with the gap region between the static and movable contacts 104, 114 and the direction of the arc current developed across the gap region of the second contact pair 104, 114 during an opening operation. Accordingly, since the Lorenz force direction actuating on the arc discharge across the second contact pair 104, 114 is inverted with respect to the Lorenz force produced across the gap region of the first contact pair 102, 112 (the direction of the arc current is reversed due to the opposite polarity of the second terminal 108), the second arc-extinguishing unit 250 is positioned at a back side of the contacts assembly 102, 104, 112, 114 and contact pair 104, 114 (i.e. on a side opposed to side where the first arc-extinguishing unit 240 is arranged) for receiving the arc discharge produced across this gap region of the second contact pair 104, 114 upon the opening operation and which is magnetically blown towards the back side of the contacts assembly 102, 104, 112, 114 by the arc-blowing magnetic unit 210.

Thus, the arc-quenching system in the present configuration divides the arrangement of the arc-extinguishing units 240 and 250 between the front and back sides of the contacts assembly 102, 104, 112, 114, i.e. between the front and back sides of the corresponding switching device 200, with respect to a symmetry plane that crosses both contact pairs 102, 112 and 104, 114 along the direction of relative movement T and which is parallel to the longitudinal direction L of the electrical switching device 200 (which in the illustrated configuration is substantially aligned with predetermined magnetic field direction).

As a result, the arc-quenching system of the present embodiment provides a switching device 200 with an enhanced suppression of arc discharges and still of a compact size, since it uses only one arc-extinguishing unit per contact pair (or terminal) of the switching device 200 and without having to reserve additional space between static contacts and respective terminals for accommodating arc-extinguishing features. The present arc-quenching system may be also used or easily implemented in existing switching devices because the arc-blowing magnetic unit 210 as well as the arc-extinguishing units 240, 250 can be simply accommodated on the region around the respective contact pairs and terminals and therefore, does not require modification of structural features of the switching devices, such as increasing the spacing between the terminals and/or between the static and movable contacts, driving mechanism of the contact bridge, and the like, so as to accommodate arc-chutes within the space between contact pairs and/or the terminals. The use of a single arc-blowing magnetic unit 210 for deflecting the arc discharges from both the first pair of contacts 102, 112 and the second pair of contacts 104, 114 also has the advantages of reducing the number of magnetic components, assembly steps and consequently, overall production costs. This configuration of the arc-quenching system may also be easily implemented in switching devices having more than two terminals disposed longitudinally along the direction L by providing respective arc-extinguishing units in correspondence with each of the contact pairs and positioned on the same front side or on the back side of the contact assembly, depending on the polarity of the respective switching device terminals which will affect the direction of the resultant Lorenz force produced at each individual contact pair.

Similarly to the embodiment described with reference to FIGS. 1 and 2, the first and second arc-extinguishing units 240, 250 may be arc chutes, each having a plurality of arc-extinguishing elements 242 and 252, such as splitting blades or fins. FIG. 5 shows a configuration in which the splitting blades 242, 252 of the first and second arc-extinguishing units 240, 250 are arranged in parallel to each other as well as transverse to the direction of relative movement T, which coincides with the direction of the gap between the static and movable contacts of each contact pair 102, 112 and 104, 114. In addition, the splitting blades 242, 252 of the first and second arc-extinguishing units 240, 250 are designed as flat plates with a L-shape which allows to arrange the splitting blades closer to the respective contact pair and minimize the distance to the contacts gap. For instance, as illustrated in FIGS. 5 and 6, the L-shaped splitting blades 242 of the first arc-extinguishing unit 240 are arranged with the shorter leg of the L shape oriented so as to project towards the gap between the contacts 102, 112, which allows reducing the distance over which the arc discharge has to be deviated by the arc-magnetic blowing unit 210. The longer leg of the L-shaped splitting blades 242 is arranged to extend along the longitudinal direction L and towards the center of the arc-quenching system, which allows to achieve compactness of the arc-quenching system. As a result, the distance from the gap region to the L-shaped splitting blades 242 of the arc-extinguishing unit 240 can be reduced and the magnetically blown arc discharge trapped at an earlier stage in comparison to squared-shape splitting blades, such as those described with reference to FIGS. 1 and 2. Moreover, the L-shape design allows that a significant part of the arc discharge is extinguished across the longer legs of the L-shapes, and therefore, still at a safe distance from the static and movable contacts 102, 112. The L-shape design and orientation of the splitting blades also allows to compensate for a reduction in the magnetic field strength caused by the increased distance between the first and second permanent magnets 212 and 214 of the arc-blowing magnetic unit 210 in the present embodiment, in comparison with the magnets distance in an arc-blowing magnetic unit provided for a single contact pair, such as the arc-blowing magnetic units 140, 150 of the previous embodiment, and using permanent magnets of a similar strength. Similarly, the splitting blades 252 of the second arc-extinguishing unit 250 are oriented with respect to the second contact pair 104, 114 such that the shorter leg of the L-shape is arranged in close proximity and projecting towards the gap region between the static and movable contacts 104, 114. The longer leg of the splitting blades 252 is arranged to extend along the longitudinal direction L and towards the center of the arc-quenching system. Similarly to the embodiment of FIG. 1, each of the first and second arc-extinguishing units 240, 250 may have one splitting blade directly connected to the contactor terminal 106 and 108, respectively, via an electrically conductive element, such as stripes 244, 254 made of an electrically conductive material or the like, in order maintain the respective splitting blades at the electrical potential of the respective terminals 106 and 108. For instance, in the configuration of FIG. 5 the lowest blade of the first arc-extinguishing unit 240 is electrically connected to the terminal 106 (i.e. the blade that is the closest to a lower side of the terminal 106). Similarly, the lowest blade of the second arc-extinguishing unit 250 is electrically connected to the terminal 108. As mentioned above, the electrically conductive elements 244, 254 are provided for the purpose of maintaining the respective arc-extinguishing elements at the same electrical potential as the terminals to which they are electrically connected to, and therefore, do not function has the guiding runners used in conventional arc chutes.

It should be noted that the L-shape and orientation of the splitting blades 242 and 252 described above with reference to the embodiments of FIGS. 5 to 7 may be also implemented in the configuration of the arc-quenching system described with reference to FIGS. 1 and 2.

Moreover, it should be noted that the shape, size and number of splitting blades of the arc extinguishing units described in the above embodiments as well as their distance from the associated contact pairs may vary depending on the specific characteristics of the electrical switching device (for e.g. separation gap between static and movable contacts, operation voltage, and the like) and therefore, may be advantageously determined and optimized for the specific design and application of the electrical switching device, for e.g. based on simulation analysis and/or by experimentation.

In summary, the arc-quenching systems according to the principles of the present invention allow to provide switching devices with an enhanced suppression of arc discharges and still of a compact size, since they employ the directionality of the magnetic blow effect imposed by the polarity of the switching device terminals to reduce the number of arc-extinguishing units to one per contact pair (or terminal). As a result, it is not needed to reserve additional space between static contacts, contact pairs and/or respective terminals for accommodating arc-extinguishing features. The arc-quenching systems of the present invention may be also advantageously used or easily implemented in existing switching devices as they can be simply accommodated around the respective contact pairs and terminals and fixed to the chassis of the existing switching devices, without requiring modification of structural features, such as spacing between the terminals, static and movable contacts, driving mechanism of the contact bridge, and the like, of the switching devices. Furthermore, the configurations of the arc-quenching systems described above with reference to FIGS. 3 to 6 may be easily implemented or adapted to switching devices having one or more than two terminals disposed longitudinally along the direction L by providing respective arc-extinguishing units in correspondence with each of the contact pairs and positioned on the front side or back side of the contact assembly, depending on the polarity of the respective switching device terminals and the resultant Lorenz force produced by the arc-blowing magnetic unit at each individual contact pair.

The present invention provides arc-quenching systems and electrical switching devices capable of providing enhanced high-voltage arc suppression without compromising size compactness and overall costs. The present invention also provides an arc quenching system having a structure capable of extending an arc discharge path and deviating it away from a gap region between contacts of the switching device, without having to excessively change the width of the gap region in order to provide effective arc suppression at for a given high-voltage load, and a switching device including the same. The present invention provides high-voltage arc quenching solutions capable of efficiently suppressing the arc produced between movable and static contacts of an electrical switching device by adding magnetic features capable of magnetically blowing (i.e. deviating) the arc away from the discharge zone and towards an arc chute positioned close to the contact pair to break the arc.

The present invention dispenses the use of guiding runners for guiding the arc towards the arc-chutes, as commonly used in conventional switching devices, by using a magnetic blow effect based on the Lorenz force principle as a replacement to deliver the arc directly to the arc chute. Moreover, as the magnetic blowing effect creates an effective extension of the arc path between movable and static contacts of a contact pair, arc-suppression is enhanced for the same contact distance. In addition to the magnetically enhanced arc-suppression, additional advantageous effects of the claimed invention is that it requires less space to implement, extends contact life, increases contact voltage and may even reduce contact distance.

Although certain features of the above exemplary embodiments were described with reference to the Figures using relative terms such as “front side”, “back side”, “left”, “right”, “upper” and “lower”, these terms are to be understood as being defined with reference to the coordinate system depicted in the respective figures. Unless otherwise specified in the description, the terms “front side”, “right side” and “upper side” are used for describing a feature that is positioned in the positive direction of the coordinate axis X, Y and Z, respectively, with respect to other features of the switching device. Nonetheless, it should be understood that these terms are used only for the purpose of facilitating the description of the respective features and how they are positioned/oriented with respect to each other and should not be construed as limiting the claimed invention or any of its components to an installation or use in a particular spatial orientation. Furthermore, in the context of the present disclosure wording such as “along a predetermined direction” is to be understood as describing a direction that substantially coincides with or that is parallel to the “predetermined direction”. Further, the term “orientation” is used in the context of a magnetic flux line to refer to the direction and sense of the magnetic flux vector along the magnetic field line. Finally, although the present invention has been described above with reference to electrical switching devices, such as contactors and high-voltage relays, the principles of the present invention can also be advantageously applied to other types of switching equipment which may benefit from protection against arc discharges across opening of contact terminals.

This invention can be used in any application where it is needed to increase arc-voltage endurance. In particular, the claimed invention may be advantageously used in low resistance contactors and relays, protection equipment against battery discharges, power equipment in industrial facilities and vehicles, such as electrical automobiles.

What is claimed is:

1. An arc quenching system, comprising:

an arc-extinguishing unit extinguishing an arc discharge produced upon a switching operation of a contact pair from a closed state to an open state, the contact pair having a static contact and a movable contact which is movable relative to the static contact between the closed state in which the movable contact touches the static contact and the open state in which the movable contact is spaced apart from the static contact by a gap in a direction of relative movement between the movable contact and the static contact; and an arc-blowing magnetic unit creating a magnetic field having a plurality of magnetic field lines that cross a gap region of the contact pair along a predetermined magnetic field direction, the arc-blowing magnetic unit creates the magnetic field lines with an orientation that is predetermined based on an electrical polarity of the static contact and a positioning of the arc-extinguishing unit to magnetically blow the arc discharge produced at the gap region toward the arc-extinguishing unit, the arc-blowing magnetic unit has a first permanent magnet and a second permanent magnet disposed with front sides facing each other such that a plurality of magnetic flux lines within the gap region of the contact pair flows from the front side of the first permanent magnet towards the front side of the second permanent magnet along the predetermined magnetic field direction.

2. The arc quenching system according to claim 1, wherein the contact pair includes a first contact pair and a second contact pair disposed adjacent to each other along a longitudinal direction that is transverse to the direction of relative movement, the arc-blowing magnetic unit creates the magnetic field having the magnetic field lines along the predetermined magnetic field direction and that cross the gap region of each of the first contact pair and the second contact pair.

3. The arc quenching system according to claim 2, wherein the arc-blowing magnetic unit is arranged with respect to the first contact pair and the second contact pair such that the predetermined magnetic field direction is parallel to the longitudinal direction.

4. The arc quenching system according to claim 2, wherein the arc-extinguishing unit includes a first arc-extinguishing unit facing the first contact pair and a second arc-extinguishing unit facing the second contact pair, the first arc-extinguishing is positioned on a side of a symmetry plane which crosses the first contact pair and the second contact pair along the direction of relative movement and parallel to the longitudinal direction.

5. The arc quenching system according to claim 4, wherein the static contacts of the first contact pair and the second contact pair have opposite polarities, and the second arc-extinguishing unit associated with the second contact pair is positioned on the side of the symmetry plane that is opposed to the side where the first arc-extinguishing unit associated with the first contact pair is positioned.

6. The arc quenching system according to claim 2, wherein the arc-blowing magnetic unit includes a first arc-blowing magnetic unit creating a first magnetic field having a plurality of first magnetic field lines along a first predetermined magnetic field direction within the gap region of the first contact pair, and a second arc-blowing magnetic unit creating a second magnetic field having a plurality of second magnetic field lines along a second predetermined magnetic field direction within the gap region of the second contact pair.

7. The arc quenching system according to claim 6, wherein the second arc-blowing magnetic unit is separate from the first arc-blowing magnetic unit.

8. The arc quenching system according to claim 6, wherein the arc-extinguishing unit includes a first arc-extinguishing unit facing the first contact pair and a second arc-extinguishing unit facing the second contact pair, the first arc-extinguishing is positioned on a side of a symmetry plane between the first contact pair and the second contact pair along the direction of relative movement and transverse to the longitudinal direction.

9. The arc quenching system according to claim 1, wherein the arc-extinguishing unit has a plurality of splitting blades arranged in parallel to each other and splitting a voltage of the arc discharge across the arc-extinguishing unit.

10. The arc quenching system according to claim 9, wherein the splitting blades are a plurality of plates with a L-shape and arranged so as to be oriented with a shorter leg of the L-shape projecting towards the gap region of the contact pair, the splitting blades are transverse to the direction of relative movement.

11. The arc quenching system according to claim 9, wherein:

the arc-extinguishing unit has an electrical contact element making a direct electrical connection between one of the splitting blades and a terminal of a switching device onto which the static contact is mounted; and/or the arc-extinguishing unit is positioned facing the gap region of the contact pair.

12. The arc quenching system according to claim 1, wherein the arc-blowing magnetic unit has a magnetic flux frame onto which the first permanent magnet and the second permanent magnet are mounted, the magnetic flux frame providing a magnetic flux path for the magnetic field lines which flow from a back side of the second permanent magnet into a back side of the first permanent magnet.

13. The arc quenching system according to claim 12, wherein the magnetic flux frame is a plate with a U-shape defined by a central plate and a pair of extended arms that extend from a left side and a right side of the central plate, the central plate mounts the magnetic flux frame to a chassis of a switching device.

14. The arc quenching system according to claim 13, wherein the first permanent magnet and the second permanent magnet are respectively arranged on the extended arms of the magnetic flux frame and at a distance from the central plate that positions the first permanent magnet and the second permanent magnet in alignment with the gap region of the contact pair when the magnetic flux frame is mounted to the chassis of the switching device.

15. The arc quenching system according to claim 1, wherein a magnetic polarization of the first permanent magnet and the second permanent magnet are selected such that the magnetic field lines are oriented from the first permanent magnet towards the second permanent magnet within the gap region of the contact pair and according to an orientation set for the electrical polarity of the static contact.

16. An electrical switching device, comprising:

a first contact pair and a second contact pair disposed adjacent to each other along a longitudinal direction of the electrical switching device, each of the first contact pair and the second contact pair has a static contact and a movable contact that is movable relative to the static contact between a closed state in which the movable contact touches the static contact and an open state in which the movable contact is spaced apart from the static contact by a gap in a direction of relative movement between the movable contact and the static contact; and an arc quenching system including an arc-extinguishing unit and an arc-blowing magnetic unit, the arc-extinguishing unit extinguishing an arc discharge produced upon a switching operation of the first contact pair or the second contact pair from the closed state to the open state, the arc-blowing magnetic unit creating a magnetic field having a plurality of magnetic field lines that cross a gap region of the first contact pair or a gap region of the second contact pair along a predetermined magnetic field direction, the arc-blowing magnetic unit creates the magnetic field lines with an orientation that is predetermined based on an electrical polarity of the static contact of the first contact pair or the second contact pair and a positioning of the arc-extinguishing unit to magnetically blow the arc discharge produced at the gap region toward the arc-extinguishing unit, the arc-blowing magnetic unit has a first permanent magnet and a second permanent magnet disposed with front sides facing each other such that a plurality of magnetic flux lines within the gap region of the first contact pair or the second contact pair flows from the front side of the first permanent magnet towards the front side of the second permanent magnet along the predetermined magnetic field direction, the arc quenching system is arranged in alignment with the first contact pair and the second contact pair such that the arc-blowing magnetic unit creates the magnetic field having the magnetic field lines that cross the gap region of each contact pair along the predetermined magnetic field direction, the arc-extinguishing unit is positioned facing one of the contact pairs.

17. The electrical switching device according to claim 16, further comprising a first terminal and a second terminal respectively connected to the static contacts of the first contact pair and the second contact pair, the first terminal and the second terminal electrically connect the electrical switching device to a plurality of external electrical potentials or a load circuit according to a polarity of operation of the electrical switching device.

18. The electrical switching device of claim 16, wherein the electrical switching device is a contactor or a high-voltage relay.

19. The electrical switching device of claim 16, wherein the electrical switching device and the arc quenching system have no guiding runners for directly guiding the arc discharge across the first contact pair and the second contacts pair toward the arc-extinguishing unit.

20. An arc quenching system, comprising:

an arc-extinguishing unit extinguishing an arc discharge produced upon a switching operation of a contact pair from a closed state to an open state, the contact pair having a static contact and a movable contact which is movable relative to the static contact between the closed state in which the movable contact touches the static contact and the open state in which the movable contact is spaced apart from the static contact by a gap in a direction of relative movement between the movable contact and the static contact, the arc-extinguishing unit has a plurality of splitting blades and an electrical contact element making a direct electrical connection between one of the splitting blades and a terminal of a switching device onto which the static contact is mounted; and an arc-blowing magnetic unit creating a magnetic field having a plurality of magnetic field lines that cross a gap region of the contact pair along a predetermined magnetic field direction, the arc-blowing magnetic unit creates the magnetic field lines with an orientation that is predetermined based on an electrical polarity of the static contact and a positioning of the arc-extinguishing unit to magnetically blow the arc discharge produced at the gap region toward the arc-extinguishing unit.

* * * * *